United States Patent
Hall, III et al.

(10) Patent No.: US 9,197,413 B1
(45) Date of Patent: Nov. 24, 2015

(54) HYBRID SECURE COMMUNICATION SYSTEM AND METHOD

(71) Applicants: Ivan N. Hall, III, Iowa City, IA (US); Kaushik Raghu, Cedar Rapids, IA (US)

(72) Inventors: Ivan N. Hall, III, Iowa City, IA (US); Kaushik Raghu, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 114 days.

(21) Appl. No.: 13/760,793

(22) Filed: Feb. 6, 2013

(51) Int. Cl.
*H04L 29/06* (2006.01)
*H04L 9/32* (2006.01)
*H04W 12/06* (2009.01)

(52) U.S. Cl.
CPC ........ *H04L 9/32* (2013.01); *H04W 12/06* (2013.01)

(58) Field of Classification Search
CPC .................................. H04L 9/32; H04W 12/06
USPC ......................................................... 713/171
See application file for complete search history.

(56) References Cited

U.S. PATENT DOCUMENTS

| | | | | |
|---|---|---|---|---|
| 7,953,871 B2* | 5/2011 | Kuz et al. | ........ | 709/229 |
| 8,607,043 B2* | 12/2013 | Rahman et al. | ........ | 713/155 |
| 8,627,422 B2* | 1/2014 | Hawkes et al. | ........ | 726/5 |
| 2004/0214556 A1* | 10/2004 | Yamada | ........ | 455/414.3 |
| 2005/0091483 A1* | 4/2005 | Fascenda | ........ | 713/153 |
| 2007/0264953 A1* | 11/2007 | Srinivasan et al. | ........ | 455/186.1 |
| 2010/0159852 A1* | 6/2010 | Kakaire | ........ | 455/90.2 |

* cited by examiner

*Primary Examiner* — Mohammad W Reza
(74) *Attorney, Agent, or Firm* — Angel N. Gerdzhikov; Donna P. Suchy; Daniel M. Barbieri

(57) ABSTRACT

Systems and methods for securely communicating between a mobile computing device and a vehicle system are provided. A method includes receiving authentication data from the mobile computing device over a first communication link between the vehicle system and the mobile computing device. The method further includes authenticating the mobile computing device using the authentication data received over the first communication link. Subsequent to the initial authentication phase, the method further allows transmitting encrypted data from the vehicle system to the mobile computing device (and vice-versa) over a second communication link. The encrypted data is encrypted using the authentication data transmitted over the first communication link. The second communication link is a wireless communication link that is more susceptible to one or more security risks than the first communication link.

20 Claims, 3 Drawing Sheets

HYBRID SECURE COMMUNICATION SYSTEM AND METHOD

BACKGROUND

The present disclosure relates generally to the field of communication between electronic devices and systems. More particularly, the present disclosure relates to systems of and methods for enabling secure communication between a mobile computing device and a mobile system such as a vehicle system using a wireless communication link.

Wireless communication is a convenient and increasingly popular method of communicating between electronic devices. However, wireless communication methods are prone to certain types of security risks and attacks, such as spoofing and/or other hacking methods. For example, an undesired device may wirelessly connect to a system and imitate an approved wireless device, prompting the system to exchange secure data with the undesired device. In some circumstances, encryption or other security information may be wirelessly exchanged, and the undesired device may obtain the encryption information by using sniffing methods. In such circumstances, the privacy of the encryption information may be lost, and the security of the wireless interface may be compromised. Thus, there is a need for a method of communicating between a mobile computing device and a mobile system such as a vehicle system that allows for the convenience of wireless communication links but reduces the security risk associated with such wireless links.

SUMMARY

One embodiment of the disclosure relates to a method of communicating between a mobile computing device and a vehicle system. The method includes receiving, at the vehicle system, authentication data from the mobile computing device over a first communication link between the vehicle system and the mobile computing device. The method further includes authenticating, at the vehicle system, the mobile computing device using the authentication data received over the first communication link. The method further includes transmitting encrypted data from the vehicle system to the mobile computing device over a second communication link. The encrypted data is encrypted using the authentication data. The second communication link is a wireless communication link that is more susceptible to one or more wireless security risks than the first communication link.

Another embodiment relates to a vehicle system comprising an electronic processor configured to receive authentication data from a mobile computing device over a first communication link between the vehicle system and the mobile computing device. The electronic processor is further configured to authenticate the mobile computing device using the authentication data received over the first communication link. The electronic processor is further configured to transmit encrypted data from the vehicle system to the mobile computing device over a second communication link. The encrypted data is encrypted using the authentication data. The second communication link is a wireless communication link that is more susceptible to one or more wireless security risks than the first communication link.

Another embodiment relates to one or more computer-readable storage media having instructions stored thereon that are executable by one or more processors to execute a method. The method includes transmitting authentication data from a mobile computing device to a vehicle system over a first communication link between the vehicle system and the mobile computing device. The authentication data includes a mobile computing device identifier and mobile computing device encryption data. The method further includes receiving vehicle system encryption data from the vehicle system over the first communication link and communicating between the mobile computing device and the vehicle system using a second communication link. Communications transmitted from the mobile computing device to the vehicle system and communications received at the mobile computing device from the vehicle system are encrypted using at least one of the mobile computing device encryption data and the vehicle system encryption data. Communications transmitted from the mobile computing device to the vehicle system include the mobile computing device identifier. The second communication link is a wireless communication link that is more susceptible to one or more wireless security risks than the first communication link.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
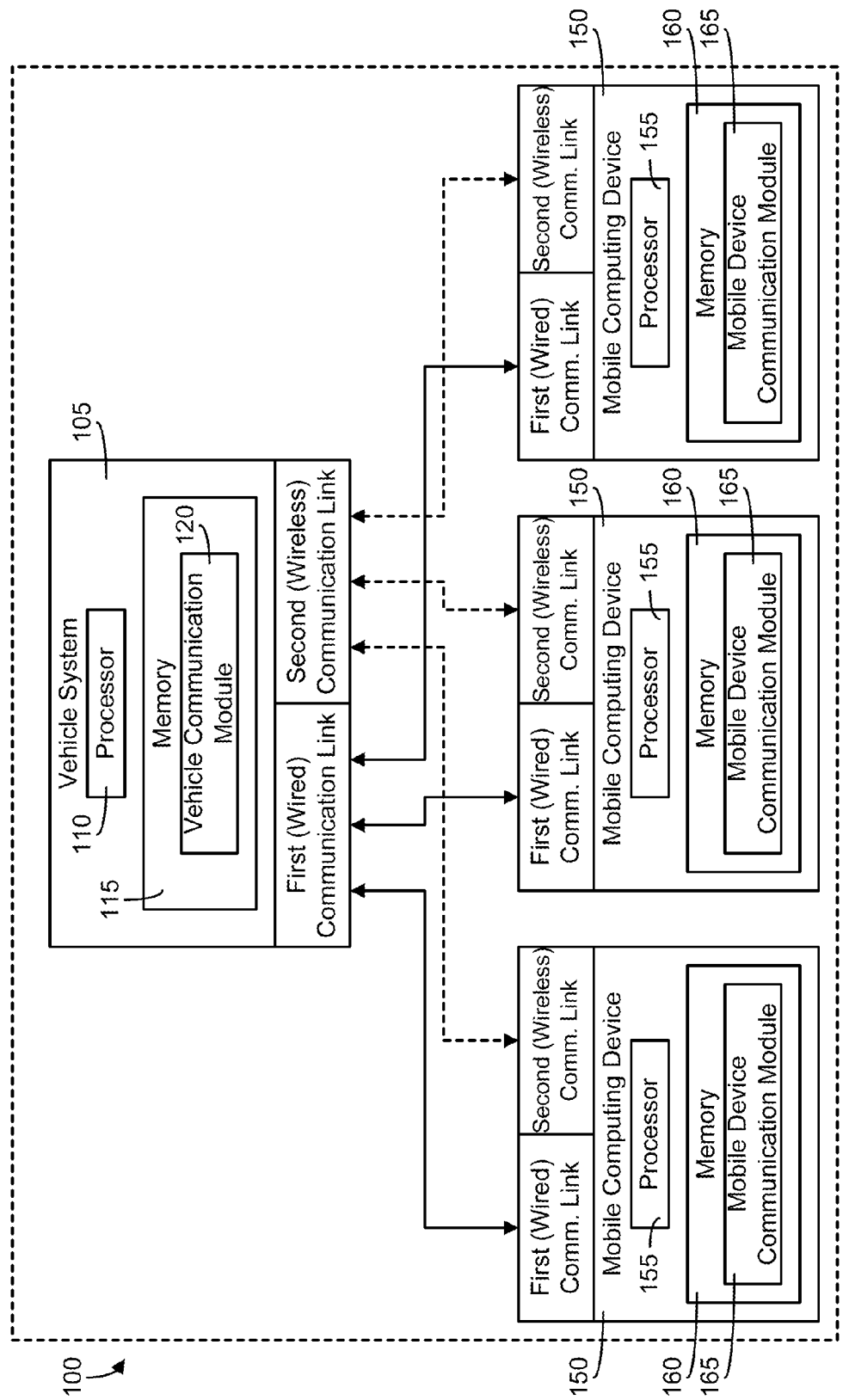
FIG. 1 is a block diagram of a system for communicating between a vehicle system and one or more mobile computing devices according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting. As discussed below, the systems and methods can be utilized in a number of control devices for various types of applications or analyzed systems.

Referring generally to the figures, systems and methods for providing secure wireless communication between a mobile computing device and a vehicle system or other mobile system are described according to exemplary embodiments. Wireless communication methods and/or protocols may be more prone to certain types of security attacks than other communication methods, such as sniffing attacks in which an undesired device may pose as an authorized device and attempt to prompt the vehicle system to exchange sensitive information with the undesired device. If initial handshake communications are mistakenly conducted with the undesired device, where authentication information (e.g., secure tokens, passcodes, encryption keys, identity information, etc.) is exchanged with the undesired device, then the undesired device may obtain information that provides it with a greater level of access to secured and potentially sensitive information.

Systems and methods of the present disclosure provide secure wireless communication between an authorized mobile computing device and the vehicle system over a wireless communication link by first authenticating the mobile computing device and exchanging security information (e.g., authentication keys and/or identifiers) over a more secure communication link, such as a wired communication link. In some embodiments, the more secure communication link may be a wired communication link, which cannot be easily sniffed without physically interfering with the cables. During an initial authentication procedure, the mobile computing device may be connected to the vehicle system using the more secure communication link and authentication/security data (e.g., identifiers and/or encryption keys associated with the mobile computing device and/or the vehicle system) may be exchanged. Exchanging this sensitive information over the more secure communication link may reduce the risk that the information is obtained by an unauthorized device through a wireless security attack. After the authentication procedure has been completed, encrypted data may be transmitted between the mobile computing device and the vehicle system using the less secure wireless communication link. The data is encrypted using the authentication/security data that was exchanged over the more secure communication link, reducing the likelihood that a hacker will be able to intercept data communications intended for the mobile computing device and decode such communications.

The systems and methods of the present disclosure may be utilized in conjunction with any type of mobile computing device and/or mobile system according to various exemplary embodiments. Exemplary mobile computing devices that may be utilized in conjunction with the embodiments of the present disclosure include, but are not limited to, mobile telephones (e.g., smartphones), personal digital assistants, mobile audio and/or video devices, gaming devices, portable storage devices, Global Positioning Receiver (GPS) devices, laptop computers, handheld computers, tablet computing devices, and/or other devices. Mobile systems that may be utilized in conjunction with the embodiments of the present disclosure may include any devices that are capable of exchanging data wirelessly with one or more mobile computing devices, such as a mobile server device. In some embodiments, the mobile system may be a system of a vehicle, such as an aircraft, truck, bus, car, etc. In some embodiments, the vehicle may be an aircraft, and the vehicle system may be an avionics system, a maintenance system, an onboard entertainment and/or data sharing system, etc. In other embodiments, the vehicle system may be a controls/maintenance system of a vehicle, an entertainment system of a vehicle (e.g., a bus), or any other type of vehicle system. All such types of mobile computing devices and mobile systems (e.g., vehicle systems) are contemplated within the present disclosure.

Referring now to FIG. 1, a block diagram of a system 100 for communicating between a vehicle system and one or more mobile computing devices is shown according to an exemplary embodiment. System 100 includes a vehicle system 105 that includes a processor 110 and a memory 115. One or more mobile computing devices 150 may be configured to communicate with vehicle system 105, and each of the mobile computing devices 150 may also include a processor 155 and a memory 160. Processors 110 and 155 may be any type of general purpose or special purpose processor (e.g., FPGA, CPLD, ASIC, etc.), and memories 115 and 160 may be any type of computer or machine-readable storage medium (e.g., ROM, RAM, hard disk, flash memory, etc.).

Vehicle system 105 may be configured to exchange data with mobile computing devices 150 over a wireless communication link (e.g., a wireless network, such as a wireless local area network (LAN)). The wireless communication link between vehicle system 105 and mobile computing devices 150 may utilize one or more of WiFi, Bluetooth, near field communication (NFC), infrared, cellular, and/or other types of wireless communication. In some embodiments, vehicle system 105 may provide mobile computing devices 150 with access to a data network such as the Internet. In some embodiments, vehicle system 105 may additionally or alternatively provide mobile computing devices 150 with access to data stored and/or secured by vehicle system 105 (e.g., in memory 115). Vehicle system 105 and mobile computing devices 150 may be configured to communicate through the use of communication modules (120 and 165, respectively) (e.g., instructions stored on memories 115 and 160 that are executable by processors 110 and 155) configured to control one or more wireless communication devices (e.g., wireless transceivers) of vehicle system 105 and mobile computing devices 150 to enable wireless communication.

To reduce the risk of attacks on the wireless communication link giving unauthorized devices access to information, vehicle system 105 may be configured to require that an authentication process be completed on a more secure communication link before the wireless communication link may be used to exchange data. Authentication data, such as identifiers (e.g., an identifier for each mobile computing device 150) and/or encryption keys (e.g., for each mobile computing device 150 and/or for vehicle system 105) may be exchanged over the more secure communication link and used to authenticate each mobile computing device 150. The data that is exchanged may then be used after authentication to encrypt and decrypt communications between vehicle system 105 and mobile computing devices 150 over the wireless network, allowing the convenience of communications over the wireless network with reduced risk that the communications will be intercepted and decoded by an intruder device. The encryption may include public key encryption or any other type of encryption. Communication modules 120 and 165 (e.g., applications/software on vehicle system 105 and mobile computing devices 150) may generate unique identifiers or other data that may be used by vehicle system 105 to confirm that mobile computing device 150 is a device that should be allowed to connect and authenticate with vehicle system 105. For example, an identifier may be assigned to each mobile computing device 150 after the mobile computing device 150 completes a registration process using communication module 165.

The secure communication link may be any link that is less susceptible to certain types of wireless networking attacks that hackers may use to gain unauthorized access to data on the wireless link, such as sniffing attacks. In some embodiments, the secure communication link may be a wired communication link, such as USB, serial (e.g., RS-232 and/or RS-422), Ethernet, fiber, etc. In some embodiments, the secure communication link may be an application or vehicle-specific communication link, such as a wired avionics communication link (e.g., A429, A664 (AFDX), A739, etc.). In some embodiments, the secure communication link may be an interrupted wired connection or half duplex connection, and an intermediary device such as a USB key may be separately attached to vehicle system 105 and mobile computing devices 150 to exchange data between the devices. For example, the intermediary device may connect to a mobile computing device 150, obtain information from the mobile computing device 150, disconnect from the mobile computing device 150, connect to vehicle system 105, and provide vehicle system 105 with some or all of the data obtained from the mobile computing device 150. The intermediary device may receive data from vehicle system 105, disconnect from vehicle system 105, connect to mobile computing device 150, and provide some or all of the data collected from vehicle system 105 to mobile computing device 150. In some embodiments, the secure communication link may be another kind of wireless communication link, provided that the secure wireless communication link includes features configured to prevent against one or more of the security vulnerabilities of the less secure wireless network.

Figure 2:
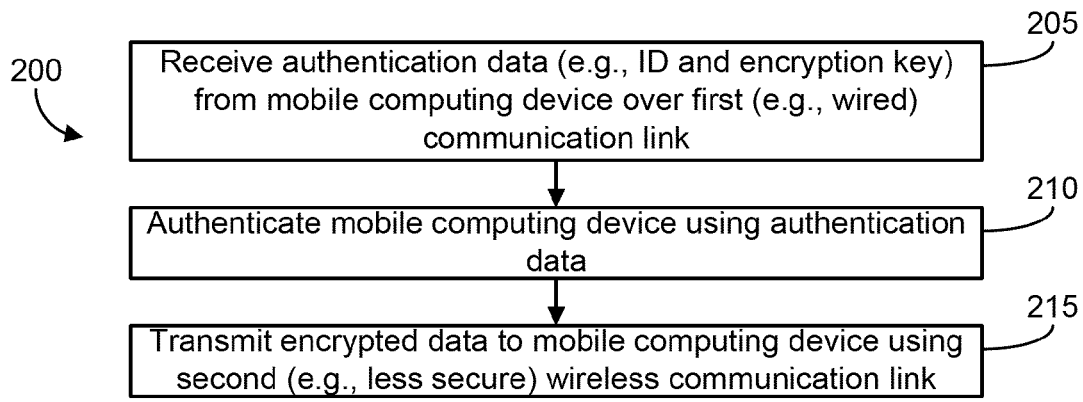
FIG. 2 is a flow diagram of a process for establishing secure wireless communications with a mobile computing device at a mobile system (e.g., a vehicle system) according to an exemplary embodiment.

Referring now to FIG. 2, a flow diagram of a process 200 for providing secure communications with one or more mobile computing devices at a mobile system such as a vehicle system is shown according to an exemplary embodiment. Process 200 allows the vehicle system to securely communicate over a wireless communication link with a mobile computing device in a manner that reduces security risks typically associated with communication over standard wireless networks connections. In some embodiments, process 200 may be carried out by a system such as vehicle system 105.

Before communication of sensitive/secure information over a less secure wireless connection is permitted, the vehicle system is configured to authenticate a mobile computing device and exchange authentication/security information that will be used to provide the secure communications. The vehicle system receives authentication data from the mobile computing device over a first, more secure communication link (205). The authentication data may include an identifier that is unique to the mobile computing device and allows the vehicle system to identify communications from/to the mobile computing device. The authentication data may additionally or alternatively include a mobile encryption key or other type of encryption and/or security data associated with the mobile computing device that the vehicle system may use to access and/or interpret communications received from the mobile computing device over the wireless communication link. In various embodiments, communications between the vehicle system and mobile computing device over the wireless link may be encrypted using public key encryption or another type of encryption. The more secure communication link may be a wired communication link, an interrupted wired or half duplex communication link, a more secure wireless communication link, or any other type of communication link that reduces or eliminates one or more security risks associated with standard wireless communication links, such as sniffing attacks. The vehicle system authenticates the mobile computing device using the authentication data received from the mobile computing device (210). The vehicle system may store some or all of the authentication data (e.g., mobile computing device identifier and/or encryption key) in a memory for use in later communications with the mobile computing device over the wireless link. The vehicle system may transmit authentication/security data to the mobile computing device, such as an encryption key associated with the vehicle system.

After the mobile computing device has been authenticated, the vehicle system may exchange data with the mobile computing device over the wireless communication link in a secure manner using the authentication/security data exchanged over the more secure (e.g., wired) communication link. The vehicle system may transmit at least some data (e.g., secure or sensitive data) to the mobile computing device over the wireless communication link in an encrypted or otherwise secured format (215). In some embodiments, the data may be encrypted using the mobile and/or vehicle encryption keys exchanged over the more secure link. The data may include the unique identifier of the mobile computing device. Even if one or more communications between the vehicle system and mobile computing device are intercepted by an intruder device, the intruder device will not have access to the authentication data (e.g., encryption keys) used to secure the communications and will not be able to interpret the intercepted data.

In some embodiments, a portion of the data exchanged between the vehicle system and the mobile computing device may be secured (e.g., in the manner described above) and a portion of the data may not be secured by authentication over a more secure communication link. For example, an aircraft wireless networking system may be configured to enable mobile computing devices of passengers to access one or more non-sensitive resources, such as Internet access and entertainment (e.g., movies and/or music). The aircraft wireless networking system may also provide access to more sensitive information (e.g., flight manifests, route data, technical data regarding the aircraft, etc.) for use by the flight crew, but only once the mobile computing devices of the flight crew have first been authenticated over the more secure (e.g., wired) communication link. In some embodiments, the vehicle system may allow seamless authentication and access to sensitive information while a communication session is already in progress. For example, a passenger in the vehicle may access unsecured resources of the vehicle system (e.g., Internet access) prior to authentication and may connect to the more secure communication link and authenticate with the vehicle system to access secured resources without closing the initial session. In some embodiments, the vehicle system may require the mobile computing device to disconnect (e.g., temporarily) from the less secure wireless link while the authentication data is being exchanged.

In some embodiments, additional security measures may be instituted by the vehicle system to protect secured resources. In some embodiments, authentication may only be permitted during certain phases (e.g., operation phases) of the vehicle system. For example, an aircraft system may only permit mobile communication devices to authenticate with the aircraft system while the aircraft is on the ground, and once the aircraft has entered into flight, the devices that may access secured resources are limited to those devices that have already been authenticated by the aircraft system. In another example, a terrestrial vehicle system may only allow authentication when the vehicle is not in motion. In some embodiments, additional systems of the vehicle and/or mobile computing device (e.g., flight management system, global positioning system (GPS), etc.) may be used to confirm that the mobile computing device is a legitimate device and not an intruder device. For example, a flight management system and/or GPS may be used to determine if the aircraft is on the ground or above a specific elevation. In some embodiments, the flight management system and/or GPS may be used to determine if the aircraft is away from populated areas (e.g., allowing the pilot to use a mobile device in a reduced-stress environment, as compared to an airport or other high-traffic area). In high-traffic areas, such as airports, use and/or connection of devices may be disallowed to minimize distraction according to some embodiments.

Figure 3:
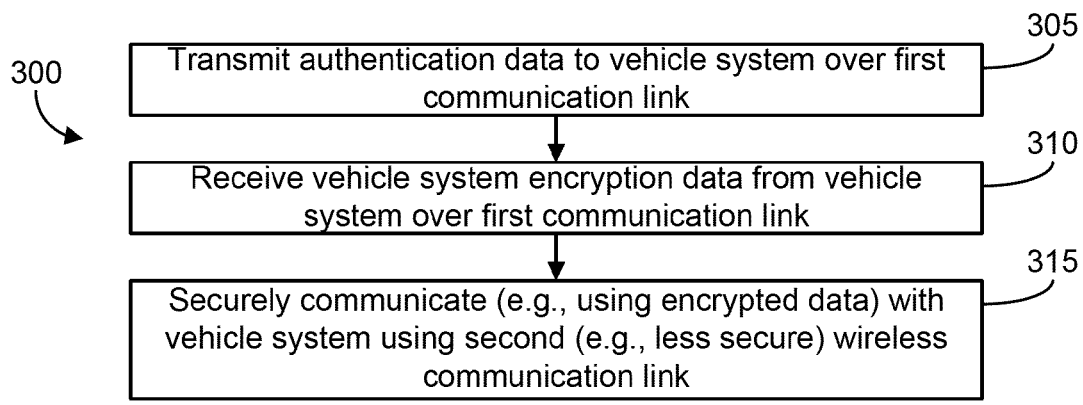
FIG. 3 is a flow diagram of a process for establishing secure wireless communications with a mobile system (e.g., a vehicle system) at a mobile computing device according to an exemplary embodiment.

Referring now to FIG. 3, a flow diagram of a process 300 for securely communicating from a mobile computing device with a mobile system such as a vehicle system is shown according to an exemplary embodiment. In some embodiments, process 300 may be carried out by a mobile computing device such as one or more of mobile computing devices 150.

During an authentication process, the mobile computing device may transmit authentication/security data to the vehicle system over a first, more secure communication link (e.g., a wired link) (305). The vehicle system may in turn transmit authentication/security data, such as encryption keys or other security information, to the mobile computing system over the same, more secure first communication link (310). Once authentication has been completed and authentication/security data has been exchanged, the mobile computing device may securely communicate with the vehicle system (e.g., using data encrypted with the authentication/security data) using a second (e.g., less secure), wireless communication link (315).

Figure 4:
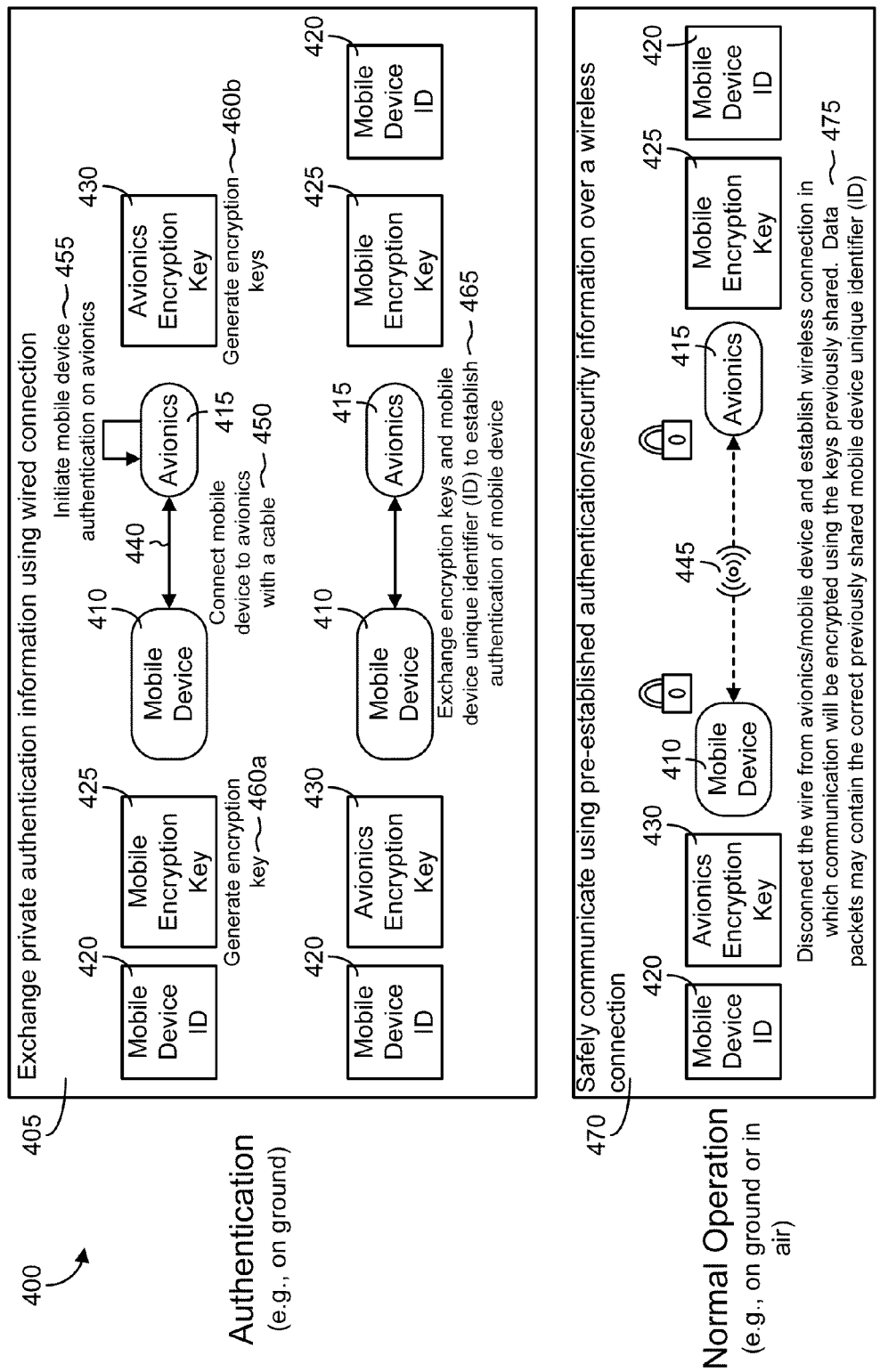
FIG. 4 is a hybrid block and flow diagram illustrating a process for establishing secure wireless communications between a mobile device and an avionics system according to an exemplary embodiment.

Referring now to FIG. 4, a hybrid block and flow diagram illustrating the flow of data between a mobile device 410 and an avionics system 415 of an aircraft that provides secure wireless communication between mobile device 410 and avionics system 415 is shown according to an exemplary embodiment. During an authentication process 405, private authentication information may be exchanged using a first, more secure (e.g., wired) communication link between mobile device 410 and avionics system 415. In some embodiments, authentication process 405 may be performed only when the aircraft is on the ground. Mobile device 410 may be connected to avionics system 415 through a more secure connection, such as a cable 440 (450). Once connected, avionics system 415 may initiate authentication of mobile device 410 (455). Mobile device 410 and avionics system 415 may be configured to generate a mobile encryption key 425 and avionics encryption key 430, respectively, to later be used in encrypting communications between mobile device 410 and avionics system 415 over a wireless communication link (460a and 460b, respectively). In some embodiments, encryption keys 425 and/or 430 may be randomly or pseudo-randomly generated. In some embodiments, a new key may be generated for each authenticated session. Mobile device 410 and avionics system 415 may exchange keys 425 and 430 with one another over cable 440 (465). In some embodiments, mobile device 410 may share a unique mobile device ID 420 with avionics system 415, and avionics system 415 may save the received mobile device ID 420 in a memory for later use.

Once authentication process 405 has been completed, a normal operation process 470 may be used to safely communicate over a second, wireless communication link 445 between mobile device 410 and avionics system 415. Mobile device 410 may be disconnected from cable 440, wireless communication link 445 may be established between mobile device 410 and avionics system 415, and communications between mobile device 410 and avionics system 415 may be encrypted using mobile encryption key 425 and/or avionics encryption key 430, each of which may be known to both mobile device 410 and avionics system 415 as a result of authentication process 405. In some embodiments, the data packets exchanged over wireless communication link 445 may include mobile device ID 420 to identify the intended recipient/source of the data packets. In the event any packets are intercepted by an intruder device, the device will not be able to interpret the packets as the intruder device will not have access to mobile encryption key 425 and avionics encryption key 430.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hard-wired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media which can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method of communicating between a mobile computing device and a vehicle system, the method comprising:
   receiving, at the vehicle system, authentication data from the mobile computing device over a first communication link between the vehicle system and the mobile computing device;
   authenticating, at the vehicle system, the mobile computing device using the authentication data received over the first communication link and based on at least one of flight management data received from a flight management system of the vehicle and global positioning data received from a global positioning system of the vehicle; and
   transmitting encrypted data from the vehicle system to the mobile computing device over a second communication link, wherein the encrypted data is encrypted using the authentication data, and wherein the second communication link is a wireless communication link having a susceptibility to one or more wireless security risks, the first communication link comprising one or more characteristics configured to reduce the susceptibility of the first communication link to the one or more wireless security risks as compared to the second communication link.

2. The method of claim 1, wherein the authentication data received from the mobile computing device comprises a mobile computing device identifier and a mobile computing device encryption key, and wherein the method further comprises:
   after authenticating the mobile computing device, transmitting a vehicle system encryption key to the mobile computing device,
   wherein the encrypted data transmitted over the second communication link is encrypted using at least one of the mobile computing device encryption key and the vehicle system encryption key.

3. The method of claim 1, wherein the first communication link comprises a wired connection between the mobile computing device and the vehicle system.

4. The method of claim 1, wherein the first communication link is established using a secure intermediary device configured to transmit data between the mobile computing device and the vehicle system by separately connecting to each of the mobile computing device and the vehicle system and providing each of the mobile computing device and the vehicle system with data received from the other of the mobile computing device and the vehicle system.

5. The method of claim 1, wherein the vehicle is an aircraft and the mobile computing device is authenticated while the aircraft is on the ground.

6. The method of claim 1, wherein the encrypted data is encrypted using public key encryption.

7. The method of claim 1, further comprising providing the mobile computing device with access to one or more unsecured resources over the second link regardless of whether the mobile computing device has been authenticated.

8. The method of claim 1, wherein the one or more wireless security risks comprise sniffing attacks.

9. The method of claim 1, wherein the data received from at least one of a flight management system and a global positioning system of the vehicle comprises at least one of vehicle elevation data or vehicle location data.

10. A vehicle system, comprising:
   a non-transitory computer-readable storage medium; and
   an electronic processor operably coupled to the non-transitory computer-readable storage medium and configured to:
      receive authentication data from a mobile computing device over a first communication link between the vehicle system and the mobile computing device;
      authenticate the mobile computing device using the authentication data received over the first communication link and based on at least one of flight management data received from a flight management system of the vehicle and global positioning data received from a global positioning system of the vehicle; and
      transmit encrypted data from the vehicle system to the mobile computing device over a second communication link, wherein the encrypted data is encrypted using the authentication data, and wherein the second communication link is a wireless communication link having a susceptibility to one or more wireless security risks, the first communication link comprising one or more characteristics configured to reduce the susceptibility of the first communication link to the one or more wireless security risks as compared to the second communication link.

11. The vehicle system of claim 10, wherein the authentication data received from the mobile computing device comprises a mobile computing device identifier and a mobile computing device encryption key, wherein the electronic processor is further configured to transmit a vehicle system encryption key to the mobile computing device after authenticating the mobile computing device, and wherein the encrypted data transmitted over the second communication link is encrypted using at least one of the mobile computing device encryption key and the vehicle system encryption key.

12. The vehicle system of claim 10, wherein the first communication link comprises a wired connection between the mobile computing device and the vehicle system.

13. The vehicle system of claim 10, wherein the first communication link is established using a secure intermediary device configured to transmit data between the mobile computing device and the vehicle system by separately connecting to each of the mobile computing device and the vehicle system and providing each of the mobile computing device and the vehicle system with data received from the other of the mobile computing device and the vehicle system.

14. The vehicle system of claim 10, wherein the vehicle is an aircraft and the mobile computing device is authenticated while the aircraft is on the ground.

15. The vehicle system of claim 10, wherein the data received from at least one of a flight management system and a global positioning system of the vehicle comprises at least one of vehicle elevation data or vehicle location data.

16. One or more non-transitory computer-readable storage media having instructions stored thereon, the instructions being executable by one or more processors to execute a method comprising:
transmitting authentication data from a mobile computing device to a vehicle system over a first communication link between the vehicle system and the mobile computing device, wherein the authentication data comprises a mobile computing device identifier and mobile computing device encryption data;
authenticating the mobile computing device using the authentication data received over the first communication link and based on at least one of flight management data received from a flight management system of the vehicle and global positioning data received from a global positioning system of the vehicle; and
receiving vehicle system encryption data from the vehicle system over the first communication link;
communicating between the mobile computing device and the vehicle system using a second communication link, wherein communications transmitted from the mobile computing device to the vehicle system and communications received at the mobile computing device from the vehicle system are encrypted using at least one of the mobile computing device encryption data and the vehicle system encryption data, wherein communications transmitted from the mobile computing device to the vehicle system comprise the mobile computing device identifier, and wherein the second communication link is a wireless communication link having a susceptibility to one or more wireless security risks, the first communication link comprising one or more characteristics configured to reduce the susceptibility of the first communication link to the one or more wireless security risks as compared to the second communication link.

17. The one or more non-transitory computer-readable storage media of claim 16, wherein the first communication link comprises a wired connection between the mobile computing device and the vehicle system.

18. The one or more non-transitory computer-readable storage media of claim 16, wherein the first communication link is established using a secure intermediary device configured to transmit data between the mobile computing device and the vehicle system by separately connecting to each of the mobile computing device and the vehicle system and providing each of the mobile computing device and the vehicle system with data received from the other of the mobile computing device and the vehicle system.

19. The one or more non-transitory computer-readable storage media of claim 16, wherein the mobile computing device comprises a cellular telephone or a tablet computing device.

20. The one or more non-transitory computer-readable storage media of claim 16, wherein the data received from at least one of a flight management system and a global positioning system of the vehicle comprises at least one of vehicle elevation data or vehicle location data.

* * * * *